US010306712B2

(12) United States Patent
Robbins

(10) Patent No.: US 10,306,712 B2
(45) Date of Patent: May 28, 2019

(54) LAMINATES, AND SYSTEMS AND METHODS FOR LAMINATING

(71) Applicant: Graphic Packaging International, Inc., Atlanta, GA (US)

(72) Inventor: David W. Robbins, Larsen, WI (US)

(73) Assignee: Graphic Packaging International, LLC, Atlanta, GA (US)

( * ) Notice: Subject to any disclaimer, the term of this patent is extended or adjusted under 35 U.S.C. 154(b) by 146 days.

(21) Appl. No.: 15/239,896

(22) Filed: Aug. 18, 2016

(65) Prior Publication Data

US 2016/0360579 A1 Dec. 8, 2016

Related U.S. Application Data

(62) Division of application No. 14/494,756, filed on Sep. 24, 2014, now Pat. No. 9,451,659.

(Continued)

(51) Int. Cl.

*H05B 6/64* (2006.01)
*B32B 37/12* (2006.01)

(Continued)

(52) U.S. Cl.

CPC ............. *H05B 6/6494* (2013.01); *B32B 3/30* (2013.01); *B32B 37/0076* (2013.01);

(Continued)

(58) Field of Classification Search

CPC ..... Y10T 428/24479; Y10T 428/24521; Y10T 428/24537; Y10T 428/24545;

(Continued)

(56) References Cited

U.S. PATENT DOCUMENTS 3,807,020 A 4/1974 Van Raevels
3,867,225 A 2/1975 Nystrand (Continued)

FOREIGN PATENT DOCUMENTS

EP 1 796 988 2/2012
JP 05314888 11/1993

(Continued)

OTHER PUBLICATIONS

Translation of JP2008311416. (Year: 2008).*

(Continued)

*Primary Examiner* — Catherine A. Simone

(74) *Attorney, Agent, or Firm* — Womble Bond Dickinson (US) LLP

(57) ABSTRACT

A frangible laminate includes first, second and third webs, and the second web is positioned between the first and third webs. The forming of the frangible laminate includes adhesively bonding a first plurality of sections of the second web to the first web, applying release material in order to inhibit at least some of any bonding between the first plurality of sections of the second web and the third web, and adhesively bonding a second plurality of sections of the second web to the third web. The frangible laminate is separated into a first laminate and a second laminate, so that the first laminate includes the first web and the first plurality of sections of the second web, and the second laminate includes the third web and the second plurality of sections of the second web.

10 Claims, 8 Drawing Sheets

Related U.S. Application Data

(60) Provisional application No. 61/960,771, filed on Sep. 26, 2013.

(51) Int. Cl.

*B32B 37/00* (2006.01)
*B32B 3/30* (2006.01)
*B32B 43/00* (2006.01)
*B32B 38/10* (2006.01)
*B32B 38/00* (2006.01)
*B32B 37/24* (2006.01)

(52) U.S. Cl.

CPC .......... *B32B 37/12* (2013.01); *B32B 38/0004* (2013.01); *B32B 43/006* (2013.01); *H05B 6/6408* (2013.01); *B32B 37/1292* (2013.01); *B32B 38/10* (2013.01); *B32B 2037/243* (2013.01); *Y10T 428/24521* (2015.01); *Y10T 428/24545* (2015.01)

(58) Field of Classification Search

CPC ........... Y10T 428/2457; Y10T 428/428; Y10T 428/1303; Y10T 428/1338; Y10T 428/1317; Y10T 428/1393; Y10T 428/31703; Y10T 428/31678; B32B 15/04; B32B 15/043; B32B 15/20; B32B 27/10; B32B 27/36; B32B 37/1292; B65D 81/3446; B65D 2581/3452; B65D 2581/344; B65D 2581/3489; H05B 6/6494

USPC .................................. 219/730, 759; 426/107

See application file for complete search history.

(56) References Cited

U.S. PATENT DOCUMENTS 4,012,552 A 3/1977 Watts
4,306,367 A 12/1981 Otto
4,324,823 A 4/1982 Ray, III
4,490,409 A 12/1984 Nablo
4,495,232 A 1/1985 Bauser et al.
4,605,461 A 8/1986 Ogi
4,676,857 A 6/1987 Scharr et al.
4,725,473 A 2/1988 Van Gompel
4,775,771 A 10/1988 Pawlowski et al.
4,847,134 A 7/1989 Fahrenkrug
4,865,921 A 9/1989 Hollenberg et al.
4,890,439 A 1/1990 Smart et al.
4,891,258 A 1/1990 Fahrenkrug
4,936,935 A 6/1990 Beckett
4,963,424 A 10/1990 Beckett
5,039,364 A 8/1991 Beckett et al.
5,095,186 A 3/1992 Russell et al.
5,117,078 A 5/1992 Beckett
5,153,042 A 10/1992 Indrelie
5,213,902 A 5/1993 Beckett
5,221,419 A 6/1993 Beckett
5,260,537 A 11/1993 Beckett
5,266,386 A 11/1993 Beckett
RE34,683 E 8/1994 Maynard et al.
5,340,436 A 8/1994 Beckett
5,354,973 A 10/1994 Beckett
5,376,198 A 12/1994 Fahrenkrug
5,410,135 A 4/1995 Pollart et al.
5,424,517 A 6/1995 Habeger, Jr. et al.
5,519,195 A 5/1996 Keefer et al.
5,628,921 A 5/1997 Beckett
5,672,407 A 9/1997 Beckett
5,744,219 A 4/1998 Tahara
5,759,422 A 6/1998 Schmelzer et al.
5,800,724 A 9/1998 Habeger et al.
5,820,971 A 10/1998 Kaule et al.
5,830,529 A 11/1998 Ross
6,033,513 A 3/2000 Nakamura
6,074,480 A 6/2000 Kakuta
6,114,679 A 9/2000 Lai et al.
6,150,646 A 11/2000 Lai et al.
6,171,429 B1 1/2001 Aindow
6,204,492 B1 3/2001 Zeng et al.
6,207,268 B1 3/2001 Kosaka
6,214,444 B1 4/2001 Uchibori
6,251,451 B1 6/2001 Zeng
6,267,052 B1 7/2001 Hill
6,294,241 B1 9/2001 Kaule
6,414,290 B1 7/2002 Cole et al.
6,433,322 B2 8/2002 Zeng et al.
6,455,827 B2 9/2002 Zeng
6,552,315 B2 4/2003 Zeng et al.
6,677,563 B2 1/2004 Lai
6,717,121 B2 4/2004 Zeng et al.
6,765,182 B2 7/2004 Cole et al.
6,919,547 B2 7/2005 Tsontzidis
RE39,044 E 3/2006 Ross
7,118,796 B2 10/2006 Schulz
7,319,213 B2 1/2008 Tsontzidis
7,335,274 B2 2/2008 Aso
7,930,822 B2 4/2011 Nakanishi
8,158,047 B2 4/2012 Schulz
8,562,025 B2 10/2013 Drinkwater
8,753,737 B2 6/2014 McNeil
9,208,428 B2 12/2015 Feder
2002/0018880 A1 2/2002 Young
2002/0112618 A1 8/2002 Bailey
2003/0085224 A1 5/2003 Tsontzidis
2004/0102125 A1 5/2004 Morman
2005/0098281 A1 5/2005 Schulz
2005/0211369 A1 9/2005 Aso
2005/0243391 A1 11/2005 Drinkwater
2006/0011620 A1 1/2006 Tsontzidis
2006/0108359 A1 5/2006 Brough
2006/0283538 A1 12/2006 Schulz
2007/0051467 A1 3/2007 Aso
2007/0077511 A1 4/2007 Tredwell
2007/0187946 A1 8/2007 Shaieb
2007/0214637 A1 9/2007 Nakanishi
2007/0215611 A1 9/2007 O'Hagan et al.
2008/0230176 A1 9/2008 Van De Weijer et al.
2009/0250522 A1 10/2009 Williams
2009/0302032 A1 12/2009 Middleton
2009/0322538 A1 12/2009 Kobren et al.
2010/0028621 A1 2/2010 Byrne
2010/0297377 A1 11/2010 McNeil
2011/0024947 A1 2/2011 Schulz
2011/0123773 A1 5/2011 Lofink
2011/0127257 A1 6/2011 Lai
2011/0209749 A1 9/2011 Yang
2012/0244241 A1 9/2012 McNeil
2013/0032283 A1 2/2013 Walsh et al.
2013/0049349 A1 2/2013 Feder
2013/0134698 A1 5/2013 Mayrhofer
2013/0161938 A1 6/2013 Mayrhofer
2013/0269865 A1 10/2013 Drinkwater
2014/0238596 A1 8/2014 McNeil
2014/0242320 A1 8/2014 McNeil
2015/0086751 A1 3/2015 Robbins

FOREIGN PATENT DOCUMENTS

JP 2008-311416 12/2008
WO WO 2005/068321 7/2005
WO WO 2006/052785 5/2006

OTHER PUBLICATIONS

International Search Report and Written Opinion for PCT/US2014/056946 dated Dec. 24, 2014.

International Search Report and Written Opinion of the International Search Authority from International Application No. PCT/US2012/049273, dated Feb. 28, 2013.

(56) References Cited

OTHER PUBLICATIONS

Office Action for U.S. Appl. No. 13/565,195, dated Apr. 18, 2014.
Response to Restriction Requirement for U.S. Appl. No. 13/565,195, dated Jun. 18, 2014.
Office Action for U.S. Appl. No. 13/565,195, dated Jul. 16, 2014.
Amendment and Response for U.S. Appl. No. 13/565,195, filed Oct. 2, 2014.
Office Action for U.S. Appl. No. 13/565,195, dated Oct. 23, 2014.
Request for Continued Examination (RCE) Transmittal for U.S. Appl. No. 13/565,195, dated Jan. 23, 2015.
Amendment and Response to Final Office Action for U.S. Appl. No. 13/565,195, filed Jan. 23, 2015.
Office Action for U.S. Appl. No. 13/565,195, dated Feb. 6, 2015.
Amendment and Response to Office Action for U.S. Appl. No. 13/565,195, dated May 6, 2015.
Office Action for U.S. Appl. No. 13/565,195, dated May 18, 2015.
Amendment and Response to Final Office Action for U.S. Appl. No. 13/565,195, dated Aug. 7, 2015.
Notice of Allowance and Fee(s) Due for U.S. Appl. No. 13/565,195, dated Aug. 20, 2015.
Part B—Fee(s) Transmittal for U.S. Appl. No. 13/565,195, dated Nov. 13, 2015.
Issue Notification for U.S. Appl. No. 13/565,195, dated Dec. 2, 2015.
Office Action for U.S. Appl. No. 14/494,756, dated Mar. 30, 2016.
Response to Restriction Requirement for U.S. Appl. No. 14/494,756, dated May 3, 2016.
Notice of Allowance and Fee(s) Due for U.S. Appl. No. 14/494,756, dated May 19, 2016.
Issue Fee Transmittal Form for U.S. Appl. No. 14/494,756, dated Aug. 18, 2016.
Issue Notification for U.S. Appl. No. 14/494,756, dated Aug. 31, 2016.
Notification of Reasons for Refusal for Japanese Application No. 2016-517377 dated May 24, 2017, with English translation.

* cited by examiner 32
49
51
34
54
71
63
62
50
49
47
71P
51
50
71R
24
28

63
71
50
62
50
21

32
49
51
54
49
51
54

31

84
93
50
71P
71
63
62
71R
93R
93P
22

22
252
104
106
106
110
104
106
110
50
106
152
104
110
152
104
50
106

LAMINATES, AND SYSTEMS AND METHODS FOR LAMINATING

CROSS-REFERENCED TO RELATED APPLICATIONS

This application is a divisional of U.S. patent application Ser. No. 14/494,756, filed Sep. 24, 2014, which claims the benefit of U.S. Provisional Application No. 61/960,771, filed Sep. 26, 2013.

INCORPORATION BY REFERENCE

The disclosures of U.S. patent application Ser. No. 14/494,756, which was filed on Sep. 24, 2014, and U.S. Provisional Patent Application No. 61/960,771, which was filed on Sep. 26, 2013, are hereby incorporated by reference for all purposes as if presented herein in their entirety.

FIELD OF THE DISCLOSURE

This disclosure relates to laminates that include patterned microwave energy interactive material and may be formed into constructs, such as blanks, cartons, press-formed constructs, packages or the like. More generally, this disclosure relates to laminates that may include patterned conductive material, wherein the laminates may be used in electrical/electronic components. This disclosure also relates to systems and methods for making laminates.

BACKGROUND

Microwave ovens provide a convenient means of cooking and reheating food items. Many combinations of materials of different character have been used in microwave packaging to influence the effect of the microwave energy on the food product being heated. These microwave packaging materials may be microwave transparent, for example, paper, paperboard, or many plastics, or they may be microwave energy interactive, for example, metal foils or thin metal deposits. Microwave transparent materials generally provide, for example, food product support, packaging form, insulation, and/or vapor barrier functions in packaging. Microwave energy interactive material generally provides, for example, enhanced surface heating, microwave shielding, enhanced microwave transmission, and/or energy distribution functions in packaging.

Microwave packaging often is created and configured of both microwave transparent and microwave energy interactive materials. For example, MicroRite brand trays, which are available from Graphic Packaging International, Inc., comprise aluminum foil laminated to paperboard. The aluminum foil is typically configured in predetermined shapes that define a pattern, wherein the shapes/pattern may be formed by chemically etching away (in a caustic bath) some of the foil and/or chemical deactivation of some of the foil. The configuration of the microwave energy interactive material determines performance characteristics of the microwave energy interactive material. It may be desirable to have alternatives that are less dependent on caustic chemicals.

As mentioned above, an aspect of this disclosure generally relates to methods for making laminates that may include patterned conductive material, wherein the laminates may be used in electrical/electronic components. When such laminates are made using the Resist/Caustic etch process, the conductive metal may be covered with the resist coating, which may impede the attachment of electrical connectors.

SUMMARY

An aspect of this disclosure is the provision of a method of laminating, wherein the method may include forming a frangible laminate comprising first, second and third webs, so that the second web is positioned between the first and third webs. The forming of the frangible laminate may include adhesively bonding a first plurality of sections of the second web to the first web, and adhesively bonding a second plurality of sections of the second web to the third web. Release material may be applied in order to inhibit at least some of any bonding between the first plurality of sections of the second web and the third web. The method may further include separating the frangible laminate into a first laminate and a second laminate, so that the first laminate includes the first web and the first plurality of sections of the second web, and the second laminate includes the third web and the second plurality of sections of the second web. The separating of the frangible laminate into the first and second laminates may be comprised of tearing the first and second plurality of sections of the second web apart from one another.

The first web may be referred to as a sacrificial web. The second web may comprise microwave energy interactive material. The third web may be a substrate comprising a base web. The first plurality of sections of the second web may be scrap microwave energy interactive sections. The second plurality of sections of the second web may be retained microwave energy interactive sections. The first laminate may be a sacrificial laminate. The second laminate may be a resultant laminate. The resultant laminate may be laminated to one or more additional webs or substrates to create a compound laminate that may be used as a packaging material or any other suitable material.

In the resultant and compound laminates of some embodiments of this disclosure, the retained microwave energy interactive sections are at least partially spaced apart from one another so that gaps are respectively between the sections, and at least some of the gaps may be in the form of holes in the microwave energy interactive material. The retained microwave energy interactive sections are bonded to the substrate by adhesive material that is positioned between the substrate and the sections. A side of the adhesive material may define both a plurality of protrusions of the adhesive material and a plurality of recessed surfaces of the adhesive material. Recessed surfaces of the plurality of recessed surfaces may be respectively positioned between protrusions of the plurality of protrusions. The protrusions of the adhesive material may be respectively in opposing face-to-face contact with the sections of microwave energy interactive active material.

In the compound laminate, the adhesive material may be a first layer of adhesive material, and the compound laminate may further include a second layer of adhesive material. A side of the second layer of adhesive material may defines both a plurality of protrusions of the second layer of adhesive material and a plurality of recessed surfaces of the second layer of adhesive material. Recessed surfaces of the plurality of recessed surfaces of the second layer of adhesive material may be respectively positioned between protrusions of the plurality of protrusions of the second layer of adhesive material. The protrusions of the second layer of adhesive material may respectively extend into gaps between the protrusions of the first layer of adhesive material.

The foregoing presents a simplified summary of some aspects of this disclosure in order to provide a basic understanding. The foregoing summary is not extensive and is not intended to identify key or critical elements of the invention or to delineate the scope of the invention. The purpose of the foregoing summary is to present some concepts of this disclosure in a simplified form as a prelude to the more detailed description that is presented later. For example, other aspects will become apparent from the following.

BRIEF DESCRIPTION OF THE DRAWINGS

The accompanying drawings are not necessarily drawn to scale. They are schematic and exemplary only, and should not be construed as limiting the invention.

DETAILED DESCRIPTION

Exemplary embodiments are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the invention.

Figure 1:
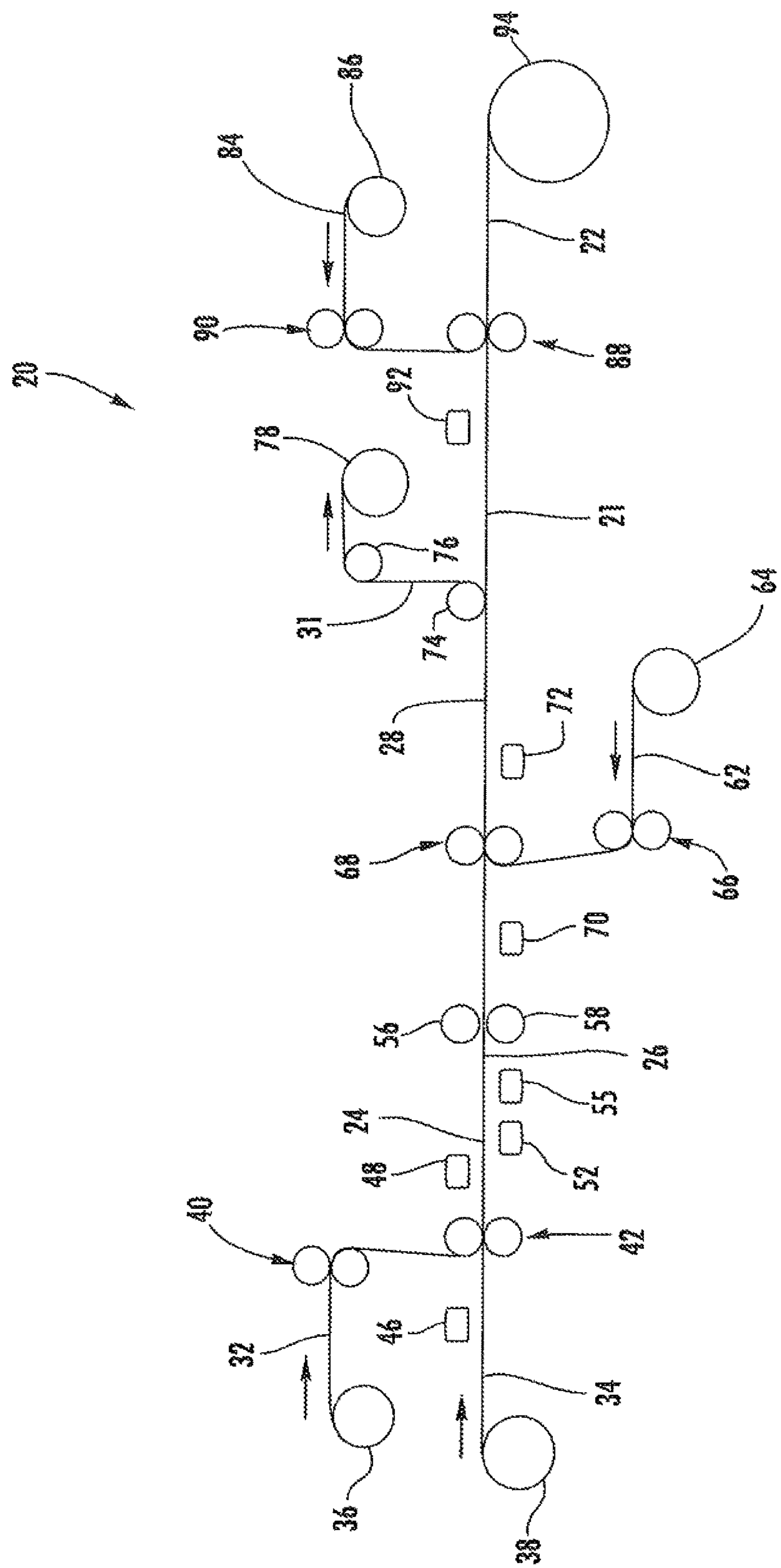
FIG. 1 is a side elevation view of a system for making resultant and compound laminates that include patterned microwave energy interactive material, in accordance with a first embodiment of this disclosure.

Referring now in greater detail to FIG. 1, a system 20 and associated methods of a first embodiment are described in the following. The system 20 and methods may be utilized in the fabrication of a resultant laminate 21 comprising both microwave transparent and microwave energy interactive materials. Optionally, the system 20 may be used to incorporate the resultant laminate 21 into a compound laminate 22. In the resultant and compound laminates 21, 22, the microwave energy interactive material is typically configured in predetermined shapes that define a pattern, so that the shapes/pattern affect the operativeness of the microwave energy interactive material. The system 20 includes numerous stations or stages that are cooperative for causing the paternization of the microwave energy interactive material. More specifically, there are several stages respectively associated with laminates that are precursors to the resultant laminate 21. For ease of understanding, the precursor laminates may be characterized as comprising an initial laminate 24, coated laminate 26, and frangible laminate 28. In addition, a sacrificial laminate 31 is formed, as will be discussed in greater detail below.

The initial laminate 24 may be comprised of a continuous web of sacrificial material 32 and a continuous web of microwave energy interactive material 34 that are secured together. The sacrificial material 32 may be a disposable substrate. For ease of readability, the web of sacrificial material 32 may be referred to as a sacrificial web 32 in the following. Similarly, the web comprising microwave energy interactive material 34 may be referred to as an interactive web 34 in the following. For example, the sacrificial web 32 may be a continuous web of low-cost, disposable material, such as, but not limited to, paper, or a thin gauge polymer film, for example, a polyethylene film, or any other suitable material, such as a reused or recycled material. For example, the sacrificial web 32 may be in the form of a clear, or substantially clear, polymer film through which ultraviolet light, or the like, may penetrate, as will be discussed in greater detail below. As one example, the sacrificial web 32 may comprise a film with relatively low thermal stability, such as polyolefin films. Any other suitable films may be used.

In the first embodiment, the interactive web 34 may be a continuous web of foil, wherein the foil is a thin sheet of metal such as, but not limited to, aluminum. As a more general example, the interactive web 34 may be a web of foil having a thickness sufficient to reflect at least a portion (and up to 100%) of impinging microwave energy. Such webs of foil typically are formed from a conductive, reflective metal or metal alloy, for example, aluminum, copper, stainless steel, silver, gold or nickel, generally having a thickness of from about 0.000285 inches to about 0.005 inches, for example, from about 0.0003 inches to about 0.003 inches. Such webs of foil may more specifically have a thickness of from about 0.00035 inches to about 0.002 inches, for example, 0.0016 inches. In one specific example, the interactive web 34 is aluminum foil that is about 5 microns to about 7 microns thick, or more specifically that is 5 microns to 7 microns thick.

The initial laminate 24 may be formed at an upstream laminating station of the system 20. At the upstream laminating station, the sacrificial and interactive webs 32, 34 are respectively drawn from supply rolls 36, 38, such as in response to operation of one or more pairs of nip rollers 40, 42, so that the sacrificial and interactive webs 32, 34 are nipped together between the upstream nip rollers 42. Prior to the nipping between the upstream nip rollers 42, one or more applicators 46 may apply adhesive material to what will become the inner face of the sacrificial web 32 and/or what will become the inner face of the interactive web 34. The one or more applicators 46 apply the adhesive material in a manner so that there is a predetermined pattern of adhesive material in the form of adhesive segments 49 (FIG. 2) positioned between the sacrificial and interactive webs 32, 34 in the initial, coated and frangible laminates 24, 26, 28. Optionally, any suitable curing and/or drying system 48 may be positioned downstream from the upstream nip rollers 40 for at least aiding in the curing and/or drying of the adhesive segments 49. The adhesive segments 49 are cured and/or dried so that the sacrificial and interactive webs 32, 34 are fixedly bonded together. For ease of understanding, adhesive materials may continue to be referred to as adhesive materials after they are cured and/or dried.

Figure 2:
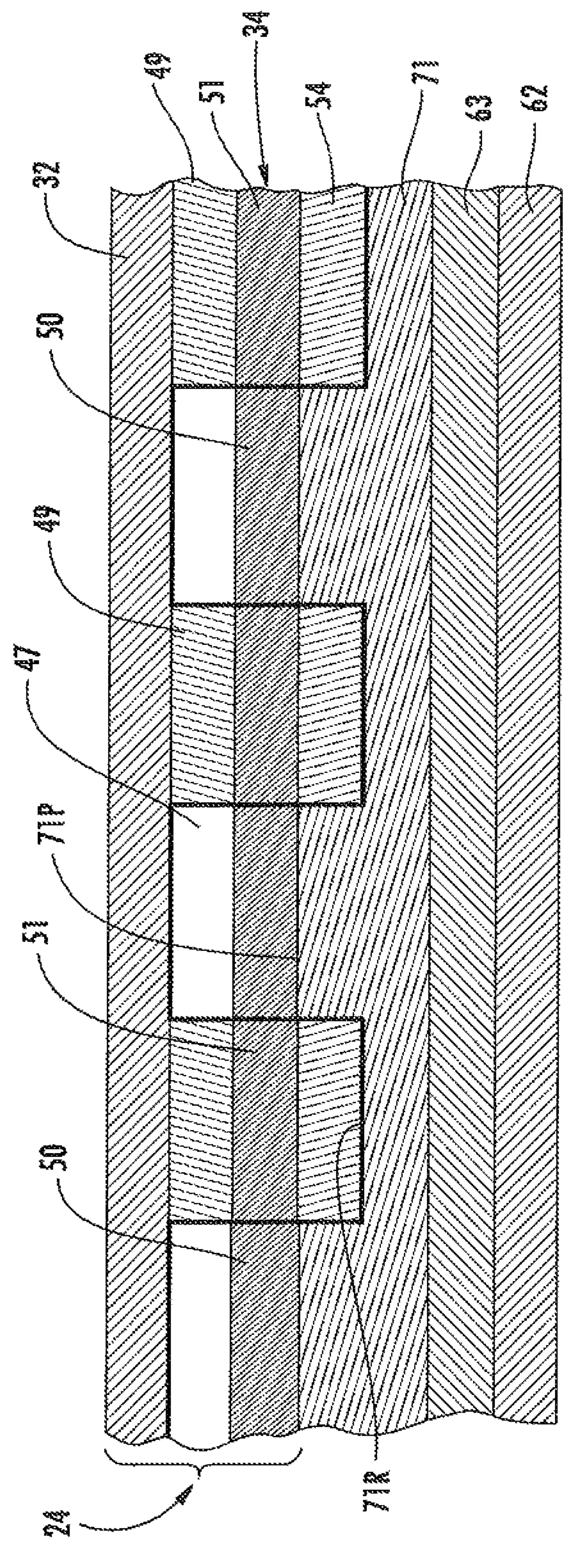
FIG. 2 is a side elevation view of a vertical cross section of a portion of a frangible laminate, which is a precursor of the resultant and compound laminates, in accordance with the first embodiment.

Referring to FIG. 2, in the initial, coated and frangible laminates 24, 26, 28, the pattern of adhesive segments 49 between the sacrificial and interactive webs 32, 34 defines both bonded and unbonded areas. More specifically, the pattern of adhesive segments 49 between the sacrificial and interactive webs 32, 34 define bonded areas of the initial laminate 24. Accordingly, in each of the bonded areas, the adjacent surfaces of the sacrificial and interactive webs 32, 34 are bonded together by a respective adhesive segment 49. The adhesive segments 49 indirectly define the unbonded areas of the initial laminate 24 so that, in each of the unbonded areas, the adjacent surfaces of the sacrificial and interactive webs 32, 34 are in opposing face-to-face relation (e.g., optionally opposing face-to-face contact) with one another, but are not bonded to one another. Each of the unbonded areas defined between the adhesive segments 49 may be in the form of, or may be generally referred to as, voids 47. Accordingly, in the initial laminate 24, there are both: sections of the interactive web 34 that are bonded to the sacrificial web 32, and sections of the interactive web 34 that are not bonded to the sacrificial web 32. For reasons that will become more apparent in the following, the sections of the interactive web 34 that are bonded to the sacrificial web 32 may be more specifically referred to as scrap interactive sections 51, unretained interactive sections or discard foil. In contrast, the sections of the interactive web 34 that are not bonded to the sacrificial web 32 may be referred to as retained interactive sections 50 or patterned foil, as will be discussed in greater detail below.

Referring back to FIG. 1, the initial laminate 24 is transformed into the coated laminate 26 at a coating station. In the coating station, one or more applicators 52 may apply a release coating to the outer face of the interactive web 34. More generally, a release material is applied to the outer face of the interactive web 34 in a predetermined pattern.

The one or more applicators 52 apply the release coating in a manner so that there is a predetermined pattern of release coat segments 54 (FIG. 2) in each of the coated, frangible and sacrificial laminates 26, 28, 31. In the first embodiment, the pattern of the release coat segments 54 corresponds or substantially corresponds in shape to, and is superposed with or substantially superposed with, the pattern of the adhesive segments 49. More specifically, the resulting release coat segments 54 are respectively superposed with or substantially superposed with the scrap interactive sections 51, as discussed in greater detail below.

The release coating, or more specifically the release coat segments 54, may be silicone, such as a silicone that is operative for adhering to aluminum. Optionally, any suitable curing and/or drying system 55 may be positioned downstream from the applicator(s) 52 for at least aiding in the curing and/or drying of the release coat segments 54. In the first embodiment, the cured and/or dried release coat segments 54 are respectively fixedly bonded to the scrap interactive sections 51.

Optionally, the coated laminate 26 may be kiss or die cut at a die cutting station, and this cutting may be carried out through the use of any suitable cutting system 56, 58. For example and not for purposes of limitation, the cutting system 56, 58 is shown in FIG. 1 in the form of a counter roller 56 and a rotary cutter 58. The coated laminate 26 is drawn between the counter roller 56 and rotary cutter 58. For example, the rotary cutter 58 may be in the form of a roller with outwardly projecting cutting features, such as cutting rules, cutting blades, or any other suitable cutting edges, configured for forming kiss cuts in the coated laminate 26, wherein the kiss cuts are arranged in a pattern ("kisscut pattern"). The kiss cutting occurs on the side of the coated laminate 26 that is defined by the interactive web 34, and the kiss cuts, when present, typically extend only partially into the interactive web 34.

The kiss cuts may be characterized as being die cuts in the interactive web 34, such that the kisscut pattern is defined by the die cuts. Each of the die cuts may be more generally referred to as a line of separation such as, but not limited to, a cut (e.g., slit), cut line, tear line, line of spaced apart cuts (e.g., perforations), and/or the like. The kisscut pattern/die cuts in the interactive web 34 may be formed in any suitable manner, such as with one or more rotary dies, flat dies, lasers, and/or the like. However and at least in theory and perhaps preferably (e.g., optionally), the cutting system 56, 58 may be omitted and the die cuts may be totally replaced with tears, or more specifically tearing that occurs in the interactive web 34 when the sacrificial laminate 31 is separated from the resultant laminate 28, as will be discussed in greater detail below. On the other hand, the cutting or scoring system 56, 58 may be configured for kisscutting or scoring the interactive web 34 in a manner that helps to facilitate the predetermined tearing that occurs in the interactive web 34 when the intermediate and sacrificial laminates 21, 31 are separated from one another, as will be discussed in greater detail below.

The kisscut pattern, kiss cuts, scores, die cuts and/or tears in the interactive web 34 are cooperatively configured with the positions of the adhesive segments 49 and release coat segments 54 for at least partially further defining the retained and scrap interactive sections 50, 51 of the interactive web 34. For ease of description, the kisscut pattern, kiss cuts, scores, die cuts and/or tears in the interactive web 34 may be generally referred to as "lines of disruption", and any suitable lines of disruption may be incorporated into the interactive web 34 at any suitable time for facilitating manufacture of the intermediate and sacrificial laminates 21, 31. At least when the sacrificial laminate 31 is separated from the resultant laminate 28, the lines of disruption in the interactive web 34 respectively separate the retained and scrap interactive sections 50, 51 of the interactive web 34 from one another. More specifically, the lines of disruption in the interactive web 34 are respectively arranged between the retained and scrap interactive sections 50, 51 such that each of the retained interactive sections 50 is substantially circumscribed by the respective line of disruption, for allowing the retained and scrap interactive sections 50, 51 to be separated from one another, as will be discussed in greater detail below.

Figure 6:
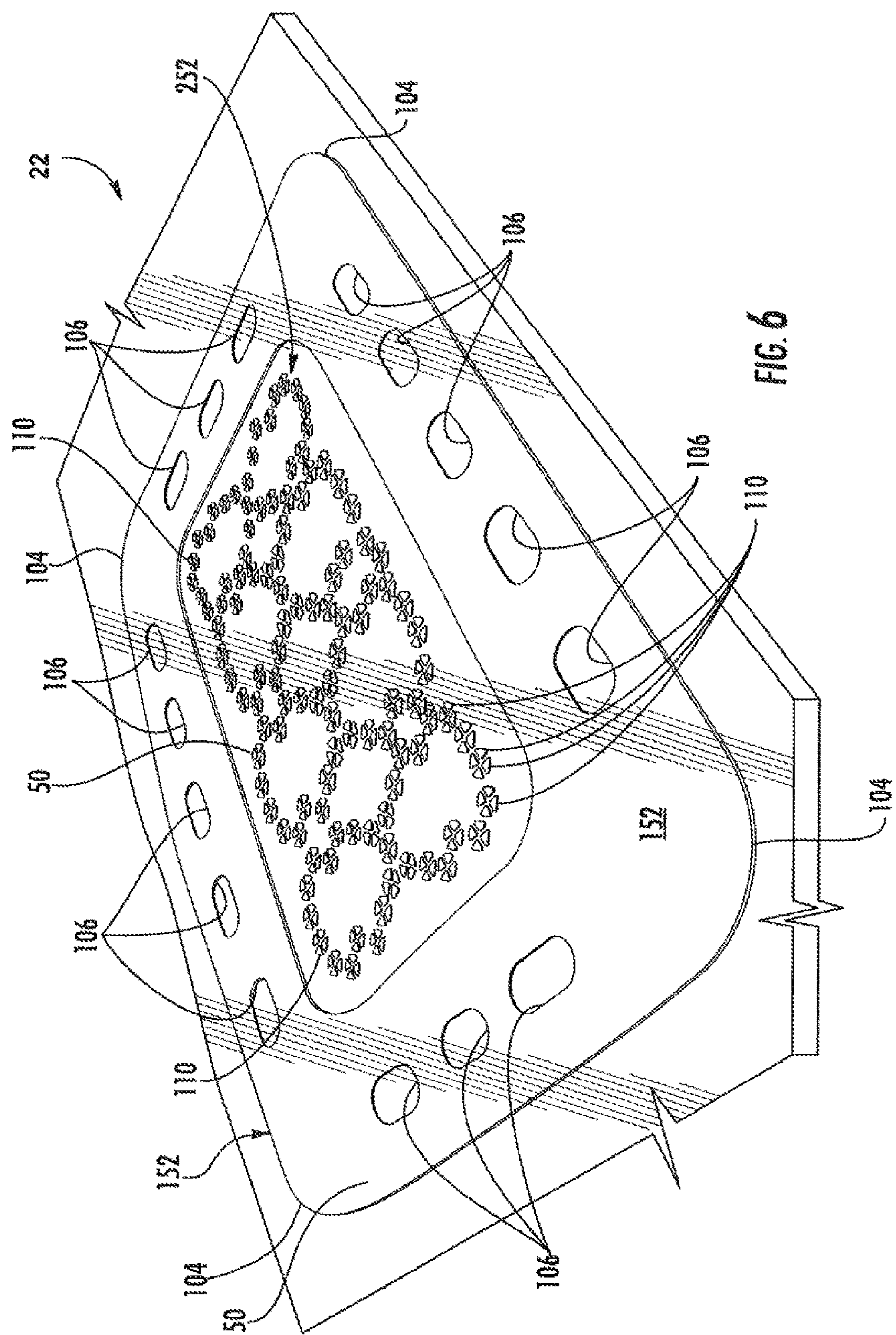
FIG. 6 is a top pictorial view of a section of the compound laminate of the first embodiment.

Referring to FIG. 1, a frangible laminate 28 is formed at an intermediate laminating station of the system 20. The frangible laminate 28 comprises the coated laminate 26 and a web of a supporting substrate or base material 62 that are secured together. For ease of readability, the web of base material 62 may be referred to as a base web 62 in the following. For example, the base web 62 may be a continuous web of any suitable supporting substrate such as, but not limited to, a polymer film (e.g., polypropylene film or polyester film), a susceptor film as discussed in greater detail below, paper and/or paperboard. For example, the base web 62 may be suitable for being formed into constructs such as, but not limited to, blanks, cartons, trays, bowls, press-formed constructs, packages, or the like. As shown in FIG. 6, when the base material 62 is a clear or substantially clear substrate, optionally graphics 63 may be printed (e.g., reverse printed) onto what will become the inner surface of the base web 62 prior to the base web being laminated to the coated laminate 26. The base web 62 with or without the graphics 63 may be generally referred to as a substrate. As one example, the base web 62 may comprise a film with relatively low thermal stability, such as polyolefin films. Any other suitable films may be used.

As shown in FIG. 1, the base web 62 is drawn from a supply roll 64, such as in response to operation of one or more pairs of nip rollers 66, 68, so that the coated laminate 26 and base web 62 are nipped together between the intermediate nip rollers 68. Prior to the nipping between the intermediate nip rollers 68, one or more applicators 70 apply a substantially continuous layer of adhesive material 71 (FIG. 2) to what will become an inner face of the coated laminate 26 and/or what will become the inner face of the base web 62. In the first embodiment, the applicator(s) 70 apply the adhesive material 71 to the entire (e.g., substantially the entire) inner face of the coated laminate 26 and/or the inner face of the base web 62. That is, the applicator(s) 70 typically apply a continuous flood coating of the adhesive material 71 to the inner face of the coated laminate 26 and/or the inner face of the base web 62. The substantially continuous layer of adhesive material 71 may be referred to as an adhesive coat 71.

Optionally, any suitable curing and/or drying system 72 may be positioned downstream from the intermediate nip rollers 68 for at least aiding in the curing and/or drying of the adhesive coat 71. The adhesive coat 71 is cured and/or dried so that the retained interactive sections 50 are fixedly bonded to the base web 62.

The release coat segments 54 are configured and effective so that the retained interactive sections 50 will become fixedly bonded to the base web 62, and the scrap interactive sections 51 do not, or more generally substantially do not, become bonded to the base web 62. The release coat segments 54 are operative for inhibiting at least some of any bonding between the scrap interactive sections 51 and the base web 62.

Referring to FIG. 2, the adhesive segments 49, adhesive coat 71 and release coat segments 54 of the frangible laminate 28 are cooperative for defining both bonded and unbonded areas in the frangible laminate 28. More specifically, the scrap interactive sections 51 are fixedly bonded to the sacrificial web 32 and not bonded (e.g., substantially not bonded) to the base web 62. In contrast, the retained interactive sections 50 are fixedly bonded to the base web 62 and not bonded (e.g., substantially not bonded) to the sacrificial web 32.

With continued reference to FIG. 2, the adhesive coat 71 and release coat segments 54 of the frangible laminate 28 are cooperative so that a side of the adhesive coat 71 includes recessed surfaces 71R respectively between protrusions 71P of the adhesive coat 71. The protrusions 71P respectively extend into gaps between the release coat segments 54 and are in opposing face-to-face contact with the retained interactive sections 50. The release coat segments 54 respectively extend into gaps between the protrusions 71P and are in opposing face-to-face contact with the recessed surfaces 71R.

Figure 3:
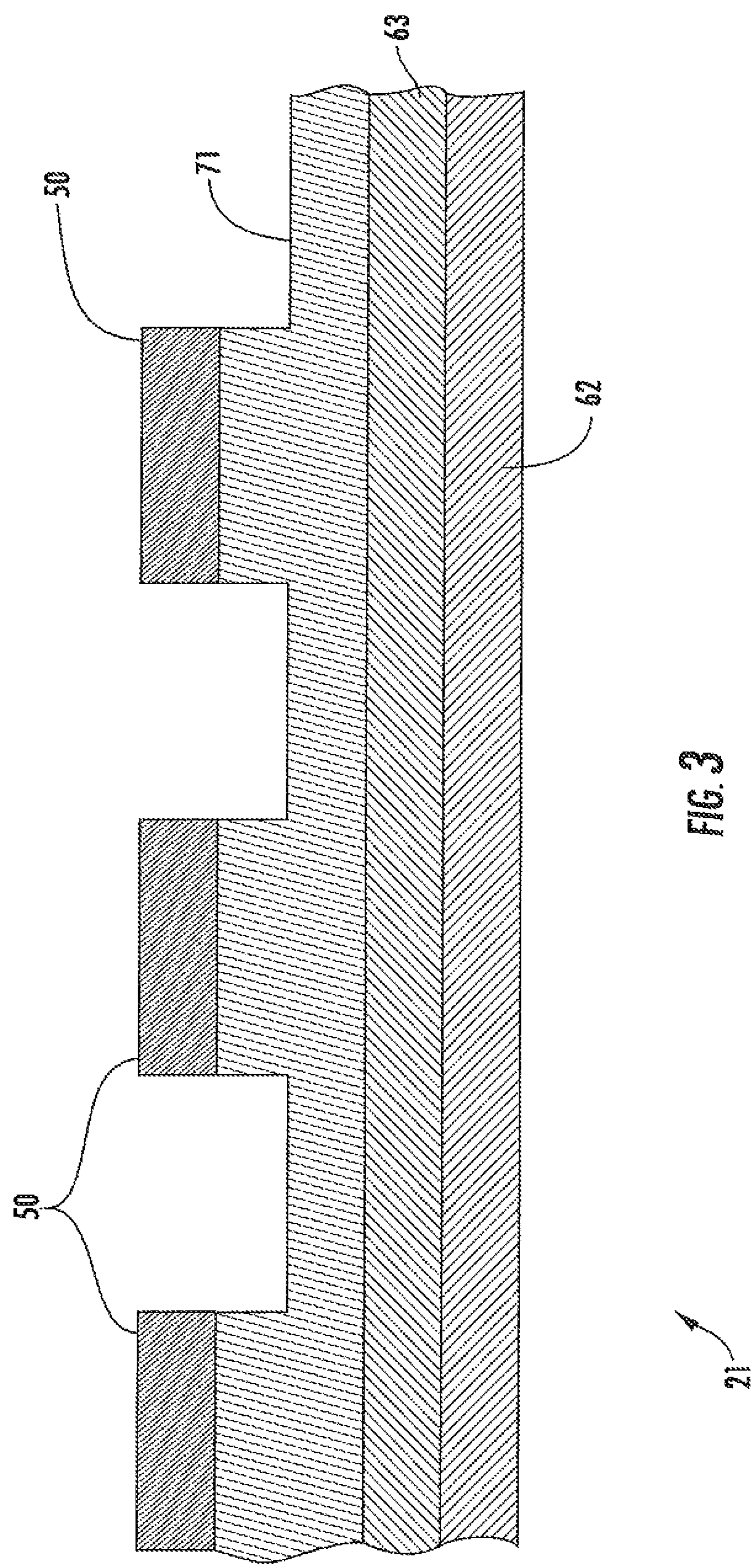
FIG. 3 is a side elevation view of a vertical cross section of a portion of the resultant laminate that has been separated from a remainder of the frangible laminate, wherein the remainder of the frangible laminate is a sacrificial laminate, in accordance with the first embodiment.

Referring to FIG. 1, the resultant laminate 21 (FIG. 3) is extracted at a stripping, separating or delamination station of the system 20. More specifically, the frangible laminate 28 (FIG. 2) is separated or delaminated (e.g., divided) into parts comprising the resultant laminate 21 (FIG. 3) and the sacrificial laminate 31 (FIG. 4) at the separating or delaminating station of the system 20. The resultant laminate 21 may be formed from the frangible laminate 28 (FIG. 2) by separating or delaminating the sacrificial web 32, adhesive segments 49, scrap interactive sections 51 and release coat segments 54 from a remainder of the frangible laminate 28, wherein the resultant laminate 21 is the remainder of the frangible laminate 28. More specifically, the sacrificial laminate 31 (FIG. 4) (which comprises the sacrificial web 32, adhesive segments 49, scrap interactive sections 51 and release coat segments 54) is stripped or delaminated from the resultant laminate 21. During the separating, the release material, or more specifically the release coat segments 54, at least partially cause adhesive bond failure between the scrap interactive sections 51 and the base web 62.

For example, the sacrificial laminate 31 may be stripped by drawing the sacrificial laminate around one or more rollers 74, 76, and forming the sacrificial laminate into a roll 78. The roll 78 may be characterized as being schematically illustrative of a conventional winding apparatus for forming the sacrificial laminate 31 into a roll. The retained interactive sections 50 remain secured to the base web 62 by way of at least the adhesive coat 71, or by way of any other suitable arrangement of adhesive material, so that the resultant laminate 21 comprises the base web 62 with retained interactive sections 50 fixedly secured thereto. In one example, substantially all of the release coat or agent 54 may be removed with the sacrificial laminate 31, so that the resultant laminate 21 is substantially absent of any of the release coat or agent 54, as will be discussed in greater detail below.

Optionally, the side of the resultant laminate 21 with the exposed retained interactive sections 50 may be smoothed, or more specifically the exposed faces of the retained interactive sections 50 may be smoothed, such as through the use of brushes or other suitable smoothing devices, to remove any rough edges of the retained interactive sections. For example and optionally, rough edges may be formed when the scrap interactive sections 51 are torn away from the retained interactive sections 50.

Further regarding the tearing between scrap interactive sections 51 and the retained interactive sections 50, it is believed that the frangible laminate 28 being separated into the resultant and sacrificial laminates 21, 31 may be comprised of at least one scrap interactive section 51 and at least one retained interactive section 50 being torn apart from one another prior to any cutting in the interactive web 34 between the at least one interactive section 51 and the at least one retained interactive sections 50. More specifically, it is believed that the frangible laminate 28 being separated into the resultant and sacrificial laminates 21, 31 may be comprised of each of the plurality of scrap interactive section 51 and each of the plurality of retained interactive sections 50 being respectively torn apart from one another prior to any cutting in the interactive web 34 therebetween. Accordingly and reiterating from above, it is believed that the cutting of the interactive web 34 at the cutting system 56, 58 is optional and may be omitted. Alternatively, the system 10 may include and use the cutting system 56, 58 as discussed above.

The sacrificial laminate 31 (FIG. 4) may be discarded, reused, recycled, or the like. Optionally, immediately after the resultant and sacrificial laminates 21, 31 are separated from one another, the resultant laminate 21 (FIG. 3) may be formed into a roll, such as by using a conventional winding apparatus. Thereafter, the resultant laminate 21 may be unwound from its roll and used in the manufacture of items that comprise the resultant laminate. In addition and/or alternatively, the resultant laminate 21 may be used in any suitable manner, such as in the construction of an article, construct, package, or the like, comprising microwave energy interactive material (e.g., the retained interactive sections 50). For example, the resultant laminate 21 may be printed upon; laminated to another substrate that may comprise paper, paperboard, polymeric film and/or microwave energy interactive material; die cut; formed into and/or incorporated into constructs such as, but not limited to, containers, pouches, bags, sleeves, blanks, cards, cartons, trays, bowls, press-formed constructs, injection-molded constructs, packages and/or the like.

In the first embodiment shown in FIG. 1, rather than being formed into a roll, the resultant laminate 21 is incorporated into the compound laminate 22 (FIGS. 5-7) at a downstream laminating station of the system 20. The compound laminate 22 comprises the resultant laminate 21 and at least one additional substrate that are secured together, wherein the additional substrate may be in the form of a continuous web of covering material 84. For ease of readability, the web of covering material 84 may be referred to as a covering web 84 in the following. For example, the covering web 84 may be a barrier layer of material such as polymer film, or more specifically a polyethylene terephthalate film, or any other suitable material. As a more specific example, the covering web 84 may be a suitable conventional polymeric sealant film, and it may serve as a food contact surface of a pouch or other construct formed from the compound laminate 22. As another example, the covering web 84 may comprise a film with relatively low thermal stability, such as polyolefin films. Any other suitable films may be used.

In the system 20 shown in FIG. 1, the covering web 84 is drawn from a supply roll 86, such as in response to operation of one or more pairs of nip rollers 88, 90, so that the resultant laminate 21 and covering web 84 are nipped together between the downstream nip rollers 90. Prior to the nipping between the downstream nip rollers 90, one or more applicators 92 apply a substantially continuous layer of adhesive material 93 (FIG. 5) to what will become an inner face of the resultant laminate 21 and/or what will become the inner face of the cover web 84, so that the cover web will become broadly, securely adhered or bonded to the resultant laminate to form the compound laminate 22. In the first embodiment, the applicator(s) 92 apply the adhesive material 93 to the entire (e.g., substantially the entire) inner face of the resultant laminate 21 and/or the inner face of the cover web 84. That is, the applicator(s) 92 typically apply a flood coating of the adhesive material 93 to the inner face of the resultant laminate 21 and/or the inner face of the cover web 84. The substantially continuous layer of adhesive material 93 may be referred to as an adhesive coat 93. The adhesive material supplied from the applicator(s) 92 is dried and/or cured so that the resultant laminate 21 and covering web 84 are fixedly bonded together. If necessary or desired, a curing and/or drying system may be provided for drying and/or curing the adhesive coat 93. The compound laminate 22 may be formed into a roll 94, and thereafter drawn from the roll and formed into constructs, packages, or the like. The roll 94 may be characterized as being schematically illustrative of a conventional winding apparatus for forming the compound laminate 22 into a roll.

Figure 5:
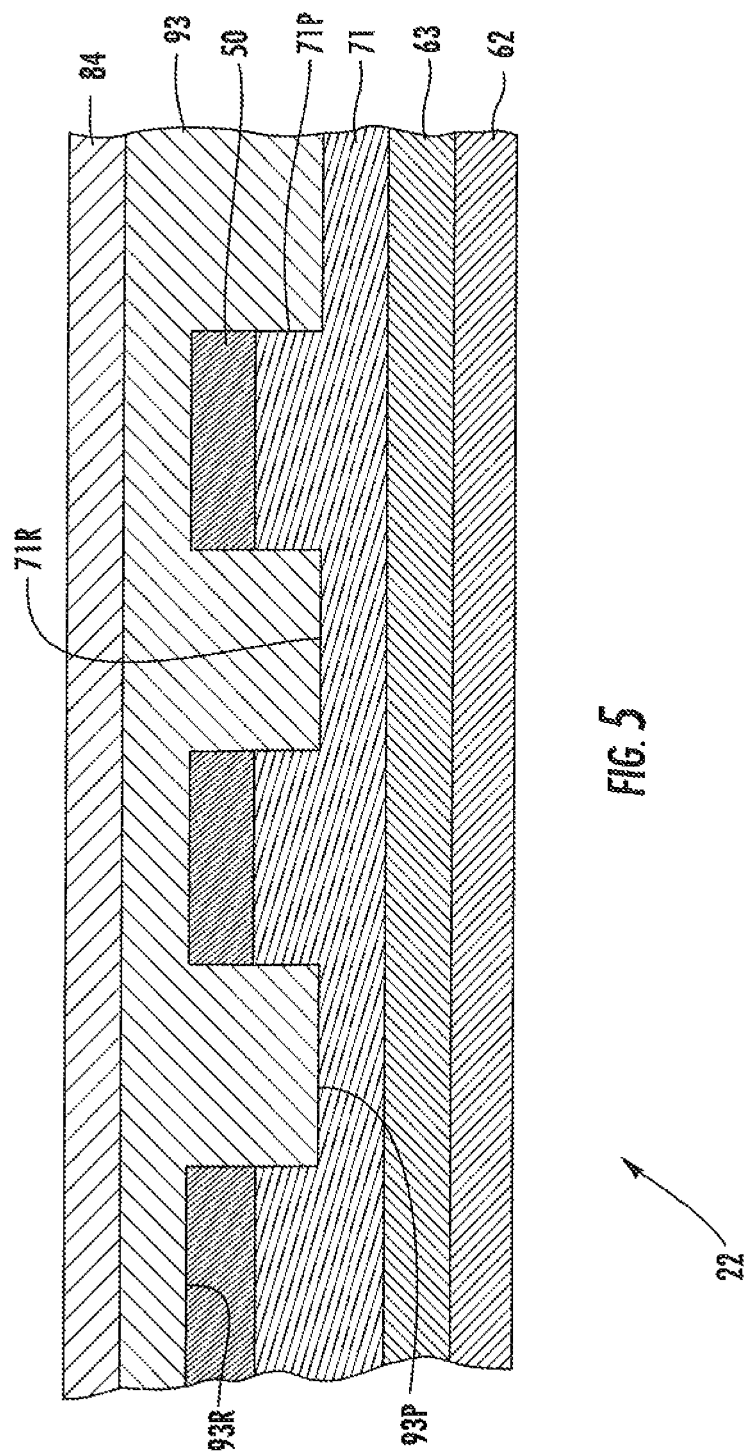
FIG. 5 is a side elevation view of a vertical cross section of a portion of the compound laminate of the first embodiment.

With continued reference to FIG. 5, the adhesive coat 93, retained interactive sections 50 and adhesive coat 71 are cooperative so that a side of the adhesive coat 93 includes recessed surfaces 93R respectively between protrusions 93P of the adhesive coat 93. The protrusions 93P extend into gaps respectively between compound protrusions, wherein each compound protrusion includes a retained interactive section 50 and a protrusion 71P of the adhesive coat 71. The protrusions 93P are respectively in opposing face-to-face contact with the recessed surfaces 71R of the adhesive coat 71. The retained interactive sections 50 and protrusions 71P respectively extend into gaps between the protrusions 93P so that the retained interactive sections 50 are respectively in opposing face-to-face contact with the recessed surfaces 93R.

In accordance with the first embodiment, each gap between compound protrusions includes a gap between retained interactive sections 50 that are at least partially spaced apart from one another. That is, the retained interactive sections 50 of the first embodiment are at least partially spaced apart from one another so that gaps are respectively between the retained interactive sections 50, and at least some of these gaps may be in the form of holes 106 (FIG. 6) in the microwave energy interactive material.

The compound laminate 22 may be formed into constructs or other suitable packages or articles in any suitable manner. For example, the compound laminate 22 may be formed into and/or incorporated into constructs such as, but not limited to, containers, pouches, bags, sleeves, blanks, cards, cartons, trays, bowls, press-formed constructs, injection-molded constructs, packages and/or the like. Accordingly, the resultant and compound laminates 21, 22 may be referred to as packaging materials that may be used as wraps, containers, pouches, bags, sleeves, blanks, cards, cartons, trays, bowls, press-formed constructs, injection-molded constructs, packages and/or the like in association with food being processed in a microwave oven, or the like.

The adhesive segments 49 and the more extensive adhesive coats 71, 93 may be formed from any suitable adhesive materials such as, but not limited to, electron beam curable ("EB-curable") adhesive material, ultraviolet-curable ("UV-curable") adhesive material, solvent-based adhesive material and/or water-based adhesive material. As a more specific example, suitable UV-curable adhesive materials may utilize or otherwise incorporate cationic UV-cure technology. For example and as compared to some other adhesive materials, the cationic UV-curable adhesive material may adhere more strongly to the microwave energy interactive material 34, such as when the microwave energy interactive material is aluminum, or the like. On the other hand and regarding the option of using an adhesive material that may not adhere as well as desired to another layer, one or more suitable tie layers may be positioned between the adhesive layer and the other layer. More generally in this regard, a variety of criteria may be used to select suitable adhesive materials and other features of the laminates. For example, when the resultant and compound laminates 21, 22 may be used in packaging for food, typically the adhesive coats 71, 93 and other components of the resultant and compound laminates will comply with relevant regulations for food packaging materials.

The release coat segments 54 may be formed from any suitable release coat material, such as, but not limited to, silicone that is operative for adhering to aluminum. The silicone may be an EB-curable, UV-curable and/or thermally curable silicone material. The applicators 46, 52, 70, 92 may be any suitable applicators such as, but not limited to, patterned roll-on applicators; patterned stamp applicators; movable, computer-controlled nozzle applicators; rotogravure printing presses; flexographic printing presses and/or any other suitable types of applicator mechanisms. Optionally, any suitable curing and/or drying systems 48, 55, 72 may be provided for at least partially curing and/or drying the substances that form the adhesive segments 49, release coat segments 54, and adhesive coats 71, 93.

Depending upon the adhesive material used, the curing and/or drying systems 48, 55, 72 may be sources of heat such as drying or curing ovens, EB sources and/or UV light sources. For example, the sacrificial web 32 may be a clear, or substantially clear, polymer film; the adhesive segments 49 may be formed from UV-curable material; and the curing system 48 may comprise at least one source of UV light for shining the UV light through the sacrificial web to the adhesive segments 49, or the like. Similarly, the base web 62 may be a clear, or substantially clear, polymer film; the adhesive coat 71 may be formed from UV-curable material; and the curing system 72 may comprise at least one source of UV light for shining the UV light through the sacrificial web to the adhesive coat 71, or the like. Similarly, the covering web 84 may be a clear, or substantially clear, polymer film; the adhesive coat 93 may be formed from UV-curable material; and a curing system may comprise at least one source of UV light for shining the UV light through the covering web 84 to the adhesive coat 93, or the like. Other suitable adhesive materials, applicators, curing systems and/or drying systems may be used. In one aspect of this disclosure, any of the polymer films may be a film with relatively low thermal stability, such as polyolefin films. Any other suitable films may be used.

In the first embodiment, the retained interactive sections 50 (FIGS. 2, 3 and 5) are microwave energy reflecting (or reflective) elements. In this regard, each of the retained interactive sections 50 may be configured as a shield that restricts (e.g., substantially restricts) the passage of microwave energy therethrough. Retained interactive sections 50 configured as shielding may be used be used in situations where a food item associated therewith is prone to scorching or drying out during heating in a microwave oven. In other cases, the retained interactive sections 50 may be in the form of smaller microwave energy reflecting elements that may be used to diffuse or lessen the intensity of microwave energy. One example of a material utilizing such microwave energy reflecting elements is commercially available from Graphic Packaging International, Inc. (Marietta, Ga.) under the trade name MicroRite® packaging material. In other examples, a plurality of microwave energy reflecting elements (e.g., retained interactive sections 50) may be configured to form a microwave energy distributing element to direct microwave energy to specific areas of a food item associated therewith. If desired, retained interactive sections 50 may be configured as loops of a length that causes microwave energy to resonate (e.g., a resonating patch antenna), thereby enhancing the distribution effect, as discussed in greater detail below.

As at least partially discussed above, each scrap interactive section 51 may be substantially superposed with both a respective adhesive segment 49 and a respective release coat segment 54. At least in theory, for each scrap interactive section 51 and the respective segments 49, 54 substantially superposed therewith, the superposition may be exact; the superposition may be close to being exact, such as by there being an offset of about 0.001 inch; or there may be any other suitable variations in the superposition. For example, for each scrap interactive section 51 and the respective segments 49, 54 substantially superposed therewith, one or more of these features may be slightly larger or slightly smaller in diameter than other(s) of these features. As another example, for each scrap interactive section 51 and the respective segments 49, 54 substantially superposed therewith, one or more of these features may be shaped slightly differently than other(s) of these features, such as a result of at least some of these features having different lengths in the machine direction.

Theoretically and in accordance with one aspect of the first embodiment, the possible offsets, variations in size and/or variations in shape between the scrap interactive section 51 and the respective segments 49, 54, or the like, may be tailored in a predetermined manner that seeks to control and/or compensate for variations in the tearing of the microwave energy interactive material 34 that at least partially (e.g., substantially) defines and separates the retained and scrap interactive sections 50, 51 from one another during the stripping apart of the resultant and sacrificial laminates 21, 31 in the system 20. Alternatively or additionally, the possible offsets, variations in size and/or variations in shape may result from any unevenness and/or variability in the tearing of the microwave energy interactive material 34 that at least partially (e.g., substantially) defines and separates the retained and scrap interactive sections 50, 51 from one another.

Any unevenness, variability and/or other attributes associated with the tearing of the microwave energy interactive material 34 may depend at least in part upon the speed of operation of the system 20, other operational characteristics and/or the characteristics of the materials used in the system. Accordingly and at least in theory, the operational characteristics of the system 20 and the characteristics of the materials used in the system may be selected and adjusted in an effort to control any unevenness, variability and/or other attributes associated with the tearing of the microwave energy interactive material 34. Accordingly and depending, for example, upon allowable tolerances in the resultant or compound laminates 21, 22 or constructs incorporating them, other variations in the superpositioning may be acceptable and are within the scope of this disclosure.

As mentioned above, the resultant and compound laminates 21, 22 may be referred to as packaging materials that may be used as wraps, containers, pouches, bags, sleeves, blanks, cards, cartons, trays, bowls, press-formed constructs, injection-molded constructs, packages and/or the like in association with food being processed in a microwave oven, or the like. Rather than forming these packaging materials 21, 22 into rolls (e.g., roll 94 in FIG. 1), the system 20 may further include processing equipment (e.g., one or more additional dies) for forming the packaging materials into final constructs such as, but not limited to, carton blanks, press-formed constructs, or the like. That is, any additional suitable processing stations may be included in the system, such as at positions proximate the downstream end of the system 20.

FIG. 6 schematically illustrates a lengthwise section of the compound laminate 22 and provides an example of one of the numerous possible configurations or patterns of the retained interactive sections 50. In FIG. 6, the covering web 84 (FIGS. 1 and 5) is facing upward and transparent, so that the retained interactive sections 50 are seen through the transparent covering web. In FIG. 6, the retained interactive sections 50 are shaped to form first and second sections 152, 252 of the retained interactive sections 50. The first section 152 of the retained interactive sections 50 or the second sections 252 of the retained interactive sections 50 may be omitted and/or configured differently than shown in FIG. 6.

As shown in FIG. 6, the first section 152 of the retained interactive sections 50 is in the form of a metal foil band including somewhat rounded corners 104 and obround holes 106 in or between the respective retained interactive sections 50, wherein the holes are in a spaced apart configuration. As used in this Detailed Description section of this disclosure, the term "obround" refers to a shape substantially consisting of two semicircles connected by parallel lines tangent to their endpoints. The first section 152 of the retained interactive sections 50 may be referred to as a microwave energy reflecting (or reflective) element that may be used as a shielding element when an associated food item is prone to scorching or drying out during heating in a microwave oven. More specifically, at least portions of the retained interactive sections 50 together with the holes 106 may be cooperative, such as for diffusing or lessening the intensity of microwave energy, such as when these features are parts of upright walls of a tray. One example of a material utilizing a combination of such microwave energy reflecting and transparent elements is commercially available from Graphic Packaging International, Inc. (Marietta, Ga.) under the trade name MicroRite® packaging material.

The second sections 252 of the retained interactive sections 50 are in the form of metal foil sections 110 arranged in clusters in a lattice-like configuration. The first section 152 of the retained interactive sections 50 is spaced from and forms a border around the second sections 252 of the retained interactive sections 50. The second sections 252 of the retained interactive sections 50 may comprise a plurality of microwave energy reflecting elements arranged to form a microwave energy distributing element that is operative for directing microwave energy to specific areas of an associated food item. If desired, the loops defined by the second sections 252 of the retained interactive sections 50 may be of a length that causes microwave energy to resonate (e.g., a resonating patch antenna), thereby enhancing the distribution effect. Examples of microwave energy distributing elements are described in U.S. Pat. Nos. 6,204,492, 6,433,322, 6,552,315, and 6,677,563, each of which is incorporated by reference in its entirety.

Referring back to FIG. 5, the covering web 84 may be a barrier layer of material such as polymer film that may serve as a food contact surface of a construct, such as a container or package, formed from the compound laminate 22 of the first embodiment. As another example, the covering web 84 may be a polymer film suitable for use in insert molding, such as in-mold labeling. Accordingly, when the covering web 84 is a clear or substantially clear substrate, graphics may be printed (e.g., reverse printed) onto what will become the inner surface of the covering web 84 prior to the covering web being laminated to the resultant laminate 21. Alternatively, the covering web 84 and adhesive coat 93 may be replaced with a coating suitable for use in insert molding, such as in-mold labeling. Optionally, the base web 62 may serve as a food contact surface of the construct formed from, or otherwise including, the compound laminate 22.

Figure 7:
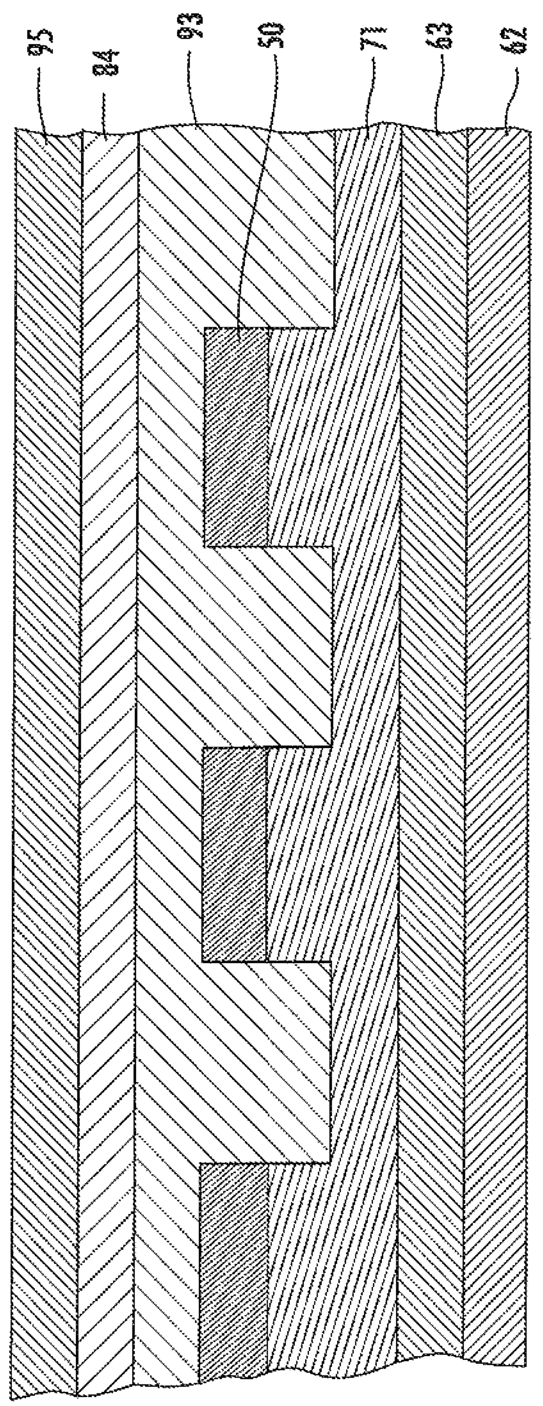
FIG. 7 is a side elevation view of a vertical cross section of a portion of a compound laminate of a second embodiment.

A second embodiment is like the first embodiment, except for variations noted and variations that will be apparent to one of ordinary skill in the art. Referring to FIG. 7, the covering web 84 of the second embodiment may comprise, consist essentially of, or consist of paper or paperboard. The paper or paperboard may be coated, printed or otherwise processed in a conventional manner. For example, graphics 95 may be printed onto the outer surface of the covering web 84. Optionally, the base web 62 may serve as a food contact surface of the construct or package formed from, or otherwise including, the compound laminate 22. The paper may have a basis weight of from about 15 to about 60 lb./ream (lb./3000 sq. ft.), for example, from about 20 to about 40 lb./ream, for example, about 25 lb./ream. The paperboard may have a basis weight of from about 60 to about 330 lb./ream, for example, from about 80 to about 200 lb./ream. The paperboard generally may have a thickness of from about 6 to about 30 mils, for example, from about 12 to about 28 mils. In one particular example, the paperboard has a thickness of about 20 mils (0.020 inches). Any suitable paperboard may be used, for example, a solid bleached sulfate board, for example, Fortress® board, commercially available from International Paper Company, Memphis, Tenn., or solid unbleached sulfate board, such as SUS® board, commercially available from Graphic Packaging International.

In the laminates of this disclosure, one or more of the layers or webs may be omitted, arranged differently, incorporated in a different order and/or other layers or webs may be included. For example, the laminates of this disclosure may further include one or more tie layers, as at least alluded to above.

As another example, a third embodiment is like the second embodiment, except for variations noted and variations that will be apparent to one of ordinary skill in the art. According to the third embodiment and referring to FIG. 1, prior to the base web 62 being laminated to the initial laminate 24, microwave energy interactive material ("MEIM") is mounted to the base web 62. Accordingly, the base web 62 and the MEIM mounted thereto may be a laminate, wherein the base web 62 may be a substrate that is transparent to microwave energy, and the base web 62 including the MEIM mounted thereto may collectively be in the form of a susceptor or susceptor film.

Figure 8:
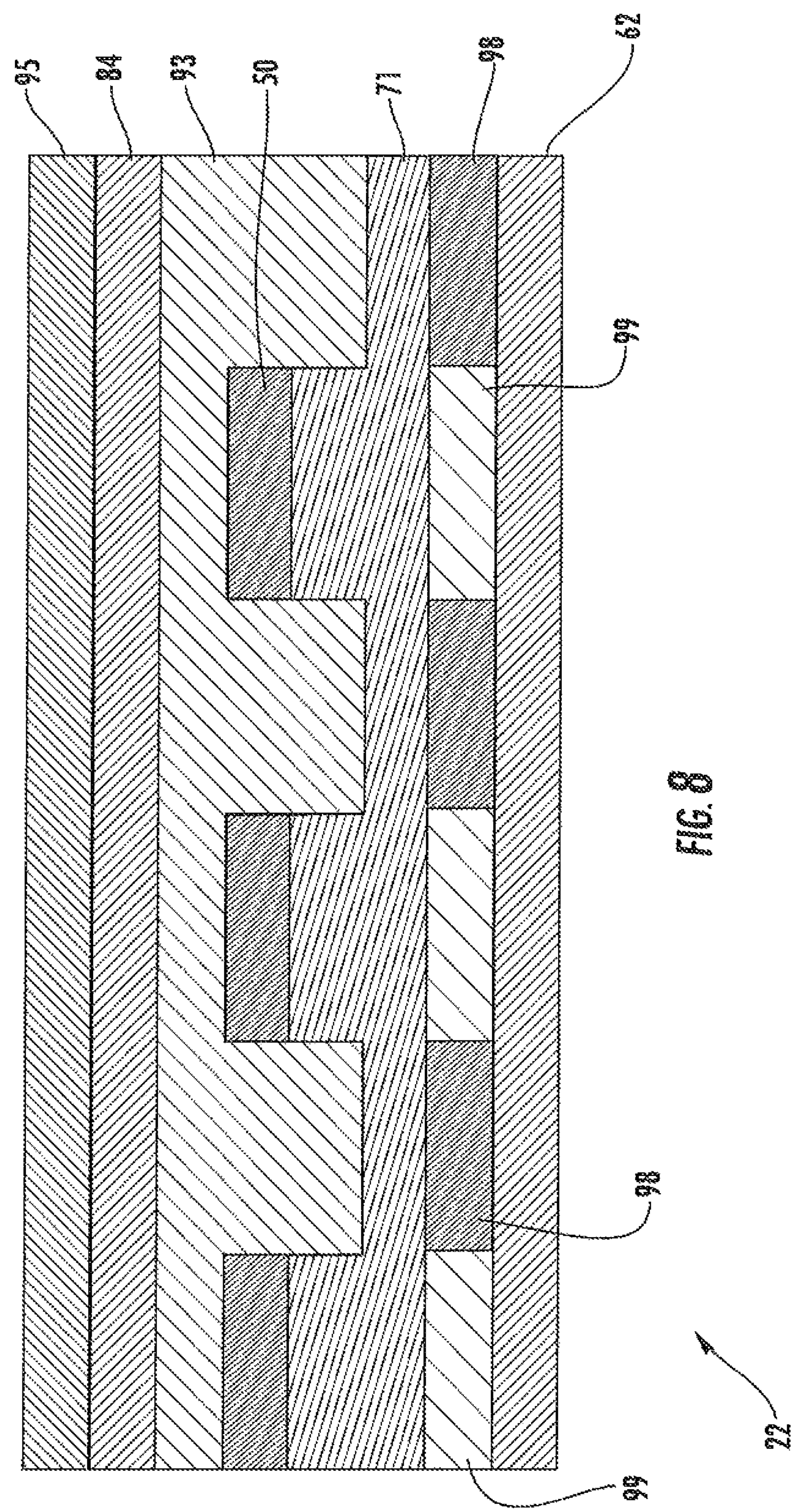
FIG. 8 is a side elevation view of a vertical cross section of a portion of a compound laminate of a third embodiment.

The MEIM, which is mounted to the base web 62 prior to the base web 62 being laminated to the initial laminate 24, may be discontinuous, such as for achieving a desired heating effect for a food item associated with the third embodiment's compound laminate 22 (FIG. 8). For example and referring to FIG. 8, the MEIM may be discontinuous by virtue of the MEIM defining patterns, such as a pattern of effective MEIM segments 98, and a pattern of removed (e.g., substantially removed) or deactivated (e.g., substantially deactivated) MEIM segments 99. The deactivated MEIM segments 99 are typically transparent to (e.g. substantially transparent to) microwave energy.

As best understood with reference to FIG. 8, in the compound laminate 22 of the third embodiment, the pattern of the deactivated MEIM segments 99 may correspond or substantially correspond in shape to, and may be superposed with or substantially superposed with, the pattern of the retained interactive sections 50. More specifically, the deactivated MEIM segments 99 may be respectively superposed with or substantially superposed with retained interactive sections 50. As a more specific example, each deactivated MEIM segment 99 may be substantially superposed with (e.g., may not be exactly superposed with) a respective retained interactive section 50 as a result of the deactivated MEIM segment 99 having a diameter that is slightly larger than the diameter of the respective retained interactive section 50. Accordingly, in the third embodiment, like other embodiments, the disclosed superposed or substantially superposed relationships may vary in any suitable manner.

Figure 4:
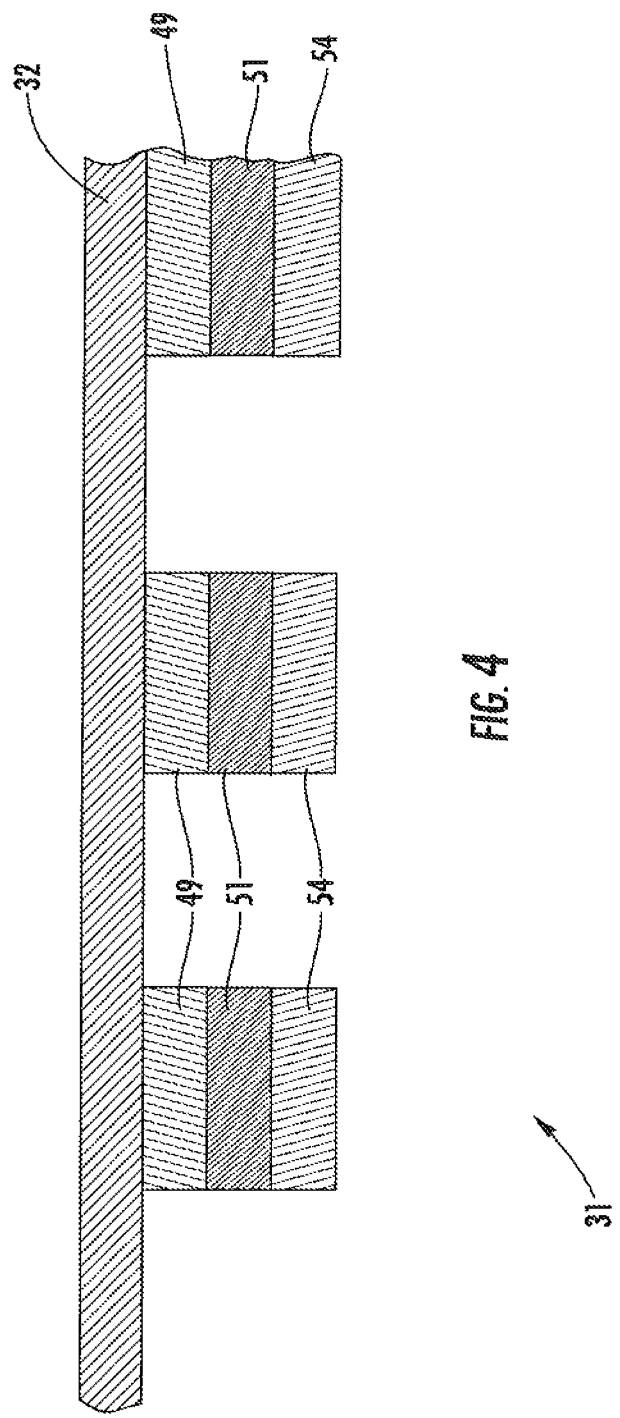
FIG. 4 is a side elevation view of a vertical cross section of a portion of the sacrificial laminate of the first embodiment.

In the third embodiment's frangible laminate 28 (FIG. 1), the pattern of the effective MEIM segments 98 may correspond or substantially correspond in shape to, and may be superposed with or substantially superposed with, the pattern of the scrap interactive sections 51 (FIGS. 2 and 4). More specifically, the effective MEIM segments 98 may be respectively superposed with or substantially superposed with scrap interactive sections 51. As a more specific example, each effective MEIM segment 98 may be substantially superposed with (e.g., may not be exactly superposed with) a respective scrap interactive section 51 as a result of the effective MEIM segment 98 having a diameter that is slightly smaller than the diameter of the respective scrap interactive section 51. Reiterating from above, the disclosed superposed or substantially superposed relationships may vary in any suitable manner.

As a more specific example regarding the base web 62 of the third embodiment, the base web 62 of the third embodiment may be transparent to microwave energy, and the MEIM may be a layer of aluminum. The base web 62 may be a polymeric film 62. The polymeric film 62 may comprise, consist of or consist essentially of polyethylene terephthalate, and the layer of aluminum is typically sufficiently thin so that it is operative for absorbing at least a portion of impinging microwave energy and converting it to thermal energy (i.e., heat) through resistive losses in the layer of aluminum. Accordingly, the polymeric film 62 together with the effective MEIM segments 98 of the third embodiment together are in the form of or comprise a susceptor film.

In one example of a method for forming the susceptor film into the patterned susceptor film including both the effective MEIM segments 98 and the deactivated MEIM segments 99, a rotogravure printing press may be used to apply a pattern of a caustic liquid, such as a liquid containing about 50% sodium hydroxide, to a continuous layer of the aluminum ("precursor aluminum") that was previously mounted to and is being carried by the base web 62. The pattern of caustic liquid may be applied by any suitable types of coaters, such as a flexographic printing press. The caustic liquid may be applied in the same pattern that is intended to be defined by the deactivated MEIM segments 99. The caustic liquid reacts with and deactivates the respective portion of the aluminum by converting it to aluminum oxide, wherein the deactivated MEIM segments 99 are the aluminum oxide. The aluminum oxide is relatively transparent to light as compared to pure aluminum. In further contrast to aluminum, aluminum oxide is an electrical insulator that is transparent to microwave energy. The base web 62 may then be laminated to the initial laminate 24 as discussed above, so that effective MEIM segments 98 are respectively superposed with or substantially superposed with scrap interactive sections 51, and the deactivated MEIM segments 99 are respectively superposed with or substantially superposed with retained interactive sections 50.

In another example of a method for forming the susceptor film into the patterned susceptor film including both the effective MEIM segments 98 and the deactivated MEIM segments 99, a rotogravure printing press may be used to apply a pattern of a resist coating to a continuous layer of the aluminum ("precursor aluminum") that was previously mounted to and is being carried by the base web 62. The pattern of resist coating may be applied by any suitable types of coaters, such as a flexographic printing press. The resist coating is applied in the same pattern that is intended to be defined by the effective MEIM segments 98. After the resist coating is dried and/or cured, the base web 62 may be drawn through a caustic bath, such as a caustic bath of 50% sodium hydroxide.

The resist coating is resistant to the caustic bath so that the caustic bath does not react with the protected portion of the aluminum, wherein the protected portion of the aluminum is superposed with the resist coating, and the effective MEIM segments 98 are the protected portion of the aluminum. In contrast, the caustic bath reacts with the unprotected portion of the aluminum, wherein the unprotected portion of the aluminum is not superposed with the resist coating. The caustic bath deactivates the unprotected portion of the aluminum by converting it to aluminum oxide, wherein the deactivated MEIM segments 99 are the aluminum oxide. The aluminum oxide is relatively transparent to light as compared to pure aluminum. In further contrast to aluminum, aluminum oxide is an electrical insulator that is transparent to microwave energy.

In accordance with the above-discussed method, the base web 62 may be rinsed with water immediately after the base web 62 is drawn out of the caustic bath. The base web 62 may then be laminated to the initial laminate 24 as discussed above, so that effective MEIM segments 98 are respectively superposed with or substantially superposed with scrap interactive sections 51, and the deactivated MEIM segments 99 are respectively superposed with or substantially superposed with retained interactive sections 50.

Examples of discontinuous MEIM (e.g., patterns of effective and deactivated MEIM segments 98, 99) and associated manufacturing methods are disclosed in U.S. Pat. Nos. 6,765,182; 6,717,121; 6,677,563; 6,552,315; 6,455,827; 6,433,322; 6,414,290; 6,251,451; 6,204,492; 6,150,646; 6,114,679; 5,800,724; 5,759,422; 5,672,407; 5,628,921; 5,519,195; 5,424,517; 5,410,135; 5,354,973; 5,340,436; 5,266,386; 5,260,537; 5,221,419; 5,213,902; 5,117,078; 5,039,364; 4,963,424; 4,936,935; 4,890,439; 4,775,771; 4,865,921; and Re. 34,683, each of which is incorporated herein by reference in its entirety. For example, U.S. Pat. No. 4,865,921 discloses that its inactivating chemical is printed directly onto the selected area or areas of the microwave interactive layer, and that the inactivating chemical dries in place after if converts the selected area into an inactivated area. More specifically, the microwave interactive film is dried after printing with the inactivating chemical, without washing away the inactivating chemical or the inactivated material of the microwave interactive layer.

Further regarding the above-discussed MEIMs (e.g., effective MEIM segments 98), a susceptor is or comprises a thin layer of MEIM that tends to absorb at least a portion of impinging microwave energy and convert it to thermal energy (i.e., heat) through resistive losses in the layer of MEIM. The MEIM may comprise an electroconductive or semiconductive material, for example a vacuum deposited metal or metal alloy, or a metallic ink, an organic ink, an inorganic ink, a metallic paste, an organic paste, an inorganic paste or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof. Typical susceptors comprise aluminum, generally less than about 500 angstroms in thickness, for example, from about 60 to about 100 angstroms in thickness, and having an optical density of from about 0.15 to about 0.35, for example, about 0.17 to about 0.28.

Alternatively, the MEIM (e.g., effective MEIM segments 98) may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In other embodiments, the MEIM (e.g., effective MEIM segments 98) may be carbon-based, for example, as disclosed in U.S. Pat. Nos. 4,943,456, 5,002,826, 5,118,747, and 5,410,135.

MEIMs (e.g., effective MEIM segments 98) may be combined with polymer films (e.g., base web 62), such as to create microwave susceptor structures that may be referred to as susceptor films. Such polymer films (e.g., base web 62) may be clear, translucent, or opaque, as needed for a particular application. The thickness of the film may typically be from about 35 gauge to about 10 mil. In one aspect, the thickness of the film is from about 40 to about 80 gauge. In another aspect, the thickness of the film is from about 45 to about 50 gauge. In still another aspect, the thickness of the film is about 48 gauge. Examples of polymeric films that may be suitable include, but are not limited to, polyolefins, polyesters, polyamides, polyimides, polysulfones, polyether ketones, cellophanes, or any combination thereof. Other non-conducting substrate materials such as paper and paper laminates, metal oxides, silicates, cellulosics, or any combination thereof, also may be used.

According to one aspect of this disclosure, the polymeric film (e.g., base web 62) may comprise polyethylene terephthalate. Examples of polyethylene terephthalate film that may be suitable for use as the primary substrate include, but are not limited to, MELINEX®, commercially available from DuPont Teijan Films (Hopewell, Va.), and SKYROL, commercially available from SKC, Inc. (Covington, Ga.). Polyethylene terephthalate films are used in commercially available susceptors, for example, the QWIK WAVE® Focus susceptor and the MICRO-RITE.® susceptor, both available from Graphic Packaging International (Marietta, Ga.).

The above-disclosed patterns (e.g., of the effective and deactivated MEIM segments 98, 99) are provided as examples only, and other patterns are within the scope of this disclosure. For example, one or more of the above-discussed patterns (e.g., of the effective and deactivated MEIM segments 98, 99) may be tailored to the desired end uses of the resultant and compound laminates 21, 22.

In accordance with one aspect of this disclosure, the metal foil pattern (e.g., the pattern of the retained interactive sections 50) may be produced without using chemical etching or die cutting. Therefore, laminates of this disclosure may be produced without there being caustic chemicals to dispose of, and without there being cutting dies which wear and require replacement.

In one aspect of this disclosure, the laminates may include thin films having relatively low thermal stability, such as polyolefin films.

One aspect of this disclosure is the provision of a method that enables the manufacture of pattern metal foils (e.g., the pattern of the retained interactive sections 50) registered to pattern etched microwave susceptors (e.g., the pattern of effective MEIM segments 98), wherein all operations (e.g., substantially all operations) may be combined on a single printing and laminating press.

In one aspect of this disclosure, combined use of pattern applied adhesive 49 and pattern applied release coat 54 on opposite sides of a metal foil 50, 51 enables a stripping mechanism to create a resultant pattern foil laminate 21.

In one aspect of this disclosure, none (e.g., substantially none) of the silicone release coat or agent 54 remains on the resultant pattern foil laminate 21, which seeks to enhance further converting of the resultant laminate 21 into a finished packaging article. In one specific example and at least in theory, all or substantially all of the release coat or agent 54 may be retained by the sacrificial laminate 31, such that it may not be necessary for the release coat or agent to comply with regulations for food packaging materials. In an alternative embodiment, the release coat or agent 54 may be omitted and the adhesive material 71 may be applied in a pattern so that only the protrusions 71P of the adhesive coat 71 are present (e.g., the recessed surfaces 71R of the adhesive coat 71 are omitted). That is, in this alternative embodiment the adhesive material 71 is not applied in a continuous flood coating.

According to one aspect of this disclosure, paper or paperboard substrates are not required to provide a cushion base for die cutting. Thus, a substantially all plastic metal foil laminate 21, 22 may be produced.

In accordance with one aspect of this disclosure, films with relatively low thermally stability, such as polyolefin films, may be included in the laminates of this disclosure. In contrast, such low thermally stable films, such as polyolefin films, may not be able to survive the high temperatures associated with chemical etching.

In at least some of the above-described and/or other embodiments, patterned conductive material 50 of the resultant and compound laminates 21, 22 may be configured so that the resultant and compound laminates may be used in electrical/electronic components such as, but not limited to, driver panels for electrostatic loudspeakers, or the like. In this regard, one or more electrical connectors may be connected to the patterned conductive material 50 in a suitable manner for at least partially facilitating operability of the electrical/electronic components.

The above-described exemplary embodiments and associated aspects are in no way intended to limit the scope of the present invention. It will be understood by those skilled in the art that while the present disclosure has been discussed above with reference to exemplary embodiments and aspects thereof, various additions, modifications and changes can be made thereto without departing from the spirit and scope of the invention, some aspects of which are set forth in the following claims.

What is claimed is:

1. A laminate comprising:

a plurality of sections of microwave energy interactive active material, wherein sections of the plurality of sections of microwave energy interactive active material are at least partially spaced apart from one another so that gaps are respectively between the sections;

at least one substrate for supporting the sections;

a first layer of adhesive material connecting the sections to the substrate so that the first layer of adhesive material is positioned between the substrate and the sections, wherein a side of the first layer of adhesive material defines both a plurality of protrusions of the first layer of adhesive material and a plurality of recessed surfaces of the first layer of adhesive material, recessed surfaces of the plurality of recessed surfaces are respectively positioned between protrusions of the plurality of protrusions, and the protrusions of the first layer of adhesive material are respectively in opposing face-to-face contact with the sections of microwave energy interactive active material;

a barrier layer extending over the sections of microwave energy interactive active material and the gaps between the sections of microwave energy interactive active material; and a second layer of adhesive material connecting the barrier layer to the sections of microwave energy interactive active material and to the recessed surfaces of the first layer of adhesive material.

2. The laminate of claim 1, wherein a gap of the gaps is a hole in the microwave energy interactive active material.

3. The laminate of claim 1, wherein the recessed surfaces of the first layer of adhesive material are respectively superposed with the gaps between the sections of microwave energy interactive active material.

4. The laminate of claim 1, wherein the sections of microwave energy interactive active material are arranged in a pattern for influencing an effect of microwave energy on a food product.

5. The laminate of claim 1, wherein the microwave energy interactive material is a layer of microwave energy interactive material.

6. The laminate of claim 1, wherein the microwave energy interactive material is metallic.

7. The laminate of claim 1, wherein the microwave energy interactive material comprises foil.

8. The laminate of claim 1, wherein the substrate comprises paper.

9. The laminate of claim 1, wherein:

the protrusions of the first layer of adhesive material are at least partially spaced apart from one another by the gaps between the sections of microwave energy interactive active material;

a side of the second layer of adhesive material defines both a plurality of protrusions of the second layer of adhesive material and a plurality of recessed surfaces of the second layer of adhesive material, recessed surfaces of the plurality of recessed surfaces of the second layer of adhesive material are respectively positioned between protrusions of the plurality of protrusions of the second layer of adhesive material, and the protrusions of the second layer of adhesive material respectively extend into the gaps between the sections of microwave energy interactive active material and the protrusions of the first layer of adhesive material.

10. The laminate of claim 9, wherein the protrusions of the second layer of adhesive material are respectively in opposing face-to-face contact with recessed surfaces of the first layer of adhesive material.

* * * * *